(12) United States Patent
Döll et al.

(10) Patent No.: US 7,025,472 B2
(45) Date of Patent: Apr. 11, 2006

(54) COUPLING ELEMENT FOR ELONGATE LAMPS AND ILLUMINATION SYSTEM HAVING THIS COUPLING ELEMENT

(75) Inventors: Gerhard Döll, Ulm (DE); Jörg Rink, Syrgenstein (DE)

(73) Assignee: Patent-Treuhand-Gesellschaft für elektrische Gluehlampen mbH, Munich (DE)

( * ) Notice: Subject to any disclaimer, the term of this patent is extended or adjusted under 35 U.S.C. 154(b) by 93 days.

(21) Appl. No.: 10/806,446

(22) Filed: Mar. 23, 2004

(65) Prior Publication Data

US 2004/0218386 A1 Nov. 4, 2004

(30) Foreign Application Priority Data

Mar. 27, 2003 (DE) .................. 103 13 956

(51) Int. Cl.
*F21S 4/00* (2006.01)
*F21V 1/00* (2006.01)
*F21V 7/00* (2006.01)
*H01R 33/08* (2006.01)

(52) U.S. Cl. .................. 362/219; 362/241; 362/247; 439/228; 439/243

(58) Field of Classification Search ............... 362/253, 362/219

See application file for complete search history.

(56) References Cited

U.S. PATENT DOCUMENTS

| | | | |
|---|---|---|---|
| 2,434,951 A * | 1/1948 | Netting | 362/217 |
| 3,202,814 A * | 8/1965 | Ceglia | 362/219 |
| 4,712,165 A * | 12/1987 | Cetrone | 362/147 |
| 5,357,412 A * | 10/1994 | Entrop et al. | 362/219 |
| 6,097,155 A | 8/2000 | Vollkommer et al. | |
| 6,224,237 B1 * | 5/2001 | Wilson | 362/223 |
| 6,605,899 B1 * | 8/2003 | Berlinghof et al. | 315/58 |

\* cited by examiner

*Primary Examiner*—Renee Luebke
*Assistant Examiner*—David Makiya
(74) *Attorney, Agent, or Firm*—William E. Meyer

(57) ABSTRACT

A coupling element (2) is proposed for the combining of at least two elongate lamps with in each case two ends. For this purpose, the coupling element (2) has a continuous receptacle area which is provided for receiving an end of each lamp. The receptacle area comprises a reflector (6) in order to reduce the luminance decrease in the region between the lamp ends. With one or a plurality of coupling elements according to the invention in conjunction with two or more elongate lamps, illumination systems having different luminous lengths can be realized in a modular manner.

3 Claims, 3 Drawing Sheets

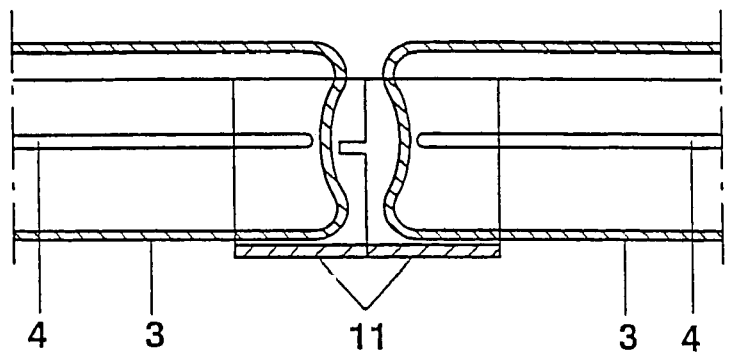
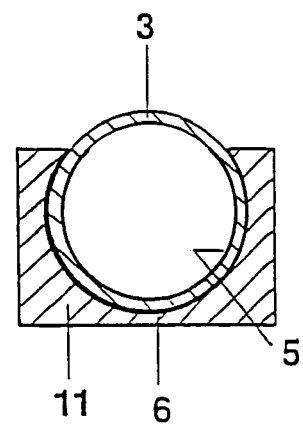
FIG. 4a  FIG. 4b
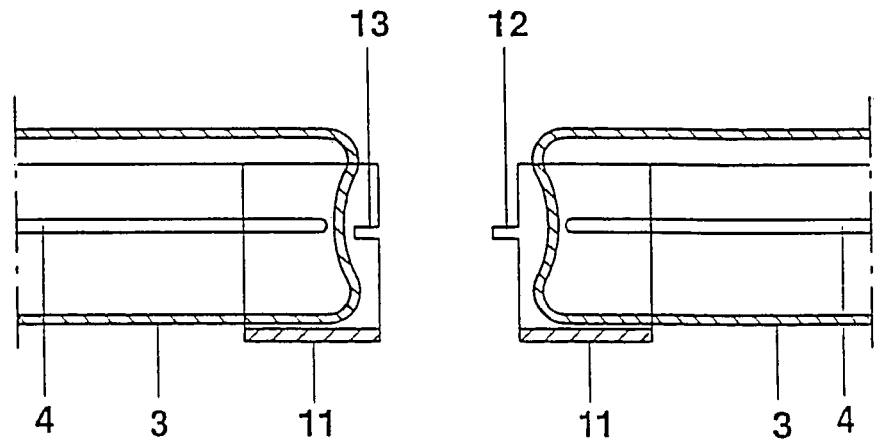
FIG. 4c
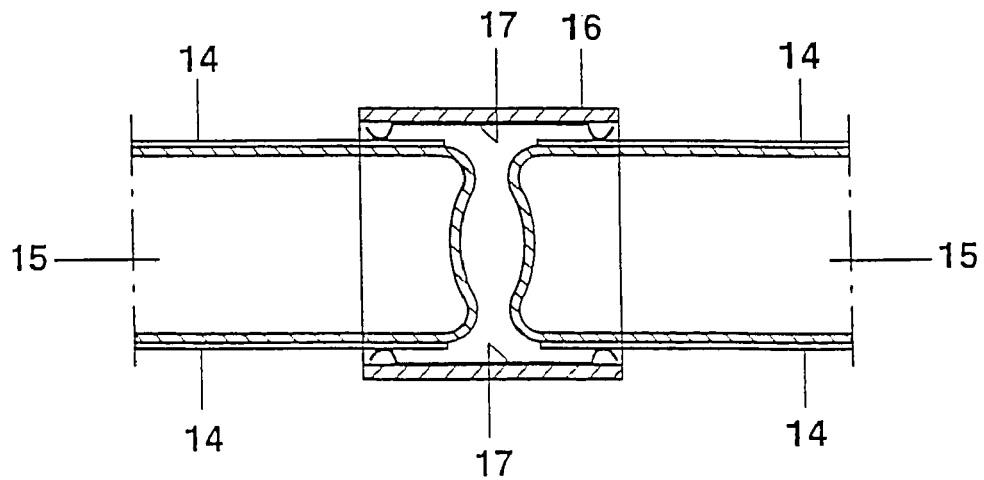
FIG. 5

COUPLING ELEMENT FOR ELONGATE LAMPS AND ILLUMINATION SYSTEM HAVING THIS COUPLING ELEMENT

TECHNICAL FIELD

The invention relates to a coupling element for elongate lamps, in particular aperture lamps. Moreover, the invention relates to an illumination system having at least two elongate lamps and at least one such coupling element.

Aperture lamps are provided with a reflector for visible light along their longitudinal axis on the inner or outer side of the lamp vessel, said reflector exhibiting a cutout over a defined region (=aperture) along the longitudinal axis. In the simplest case, the reflector is realized by a suitable thick luminescent material layer. As an alternative, an additional reflection layer may also be arranged underneath the luminescent material layer. In this case, the luminescent material layer, which is thinner here, may also extend over the entire aperture. In any event, the light generated within the lamp essentially passes only through the aperture toward the outside. As a result, a higher luminance is obtained within the aperture than without a reflector. Moreover, the light is essentially directed, i.e. emitted within an angular range which is advantageous for a highest possible illumination intensity.

Lamps of this type are used for example in exposure units for copiers, scanners, fax machines and similar devices appertaining to office automation, so-called OA devices (OA=Office Automation). However, other areas of use in which a preferred emission angle range is desirable are also conceivable, for example in automotive technology, e.g. as an indicator or brake light, and for interior illumination.

Many applications require lamps of different lengths, e.g. for scanner areas of different sizes. By way of example, there are devices which are suitable for documents up to A3 size, but there are also others which are suitable up to A2 or even up to A0. These require in each case different lamps of corresponding length.

BACKGROUND ART

U.S. Pat. No. 6,097,155 discloses a tubular aperture fluorescent lamp having a base with two connecting pins at one end. The lamp additionally has, parallel to the tube longitudinal axis, two diametrically arranged strip-type electrodes, one on the outer side and the other on the inner side of the discharge vessel wall. The two electrodes are connected to the two connecting pins in the interior of the base. For their part, the connecting pins are connected to the two poles of a pulse voltage source via electrical lines. The lamp is distinguished by a relatively high useful radiation efficiency.

DISCLOSURE OF THE INVENTION

The object of the present invention is to provide an illumination system whose luminous length can be adapted relatively simply to different requirements.

This object is achieved by means of a coupling element for the combining of at least two elongate lamps with in each case two ends, the coupling element having a continuous receptacle area which is provided for receiving an end of each lamp, which receptacle area comprises a reflector.

The advantage of the invention is that, with two or more lamps having a specific length in conjunction with one or a plurality of coupling elements according to the invention, illumination systems having different luminous lengths can be realized in a modular manner.

The basic concept of the invention firstly consists in connecting instead of a single elongate lamp having the length n·L (n=2, 3, 4, . . . ) n elongate lamps, each having the length L, at their ends to a respective special coupling element to form an illumination system. Thus, in order to connect n lamps in this way, n −1 coupling elements are necessary. The invention is to be understood in a generalized manner to the effect that the individual lamps need not necessarily be connected along a straight line. Rather, angular structures are also intended to be included. In order to reduce the luminance decrease in the region between the lamp ends, the receptacle area of each coupling element comprises a reflector.

The light which emerges through one lamp end firstly impinges on the opposite lamp end and there is either coupled into this lamp or reflected from the surface thereof. The light coupled into the opposite lamp advantageously contributes to minimizing the otherwise unavoidable light decrease at the end of this lamp. The light reflected at the second lamp either passes directly toward the outside as usable light or it is reflected back onto the first lamp or it impinges on the receptacle area of the coupling element, in particular on the reflector. At the core, axially emerging light is therefore deflected in a lateral direction and can thus be utilized for the illumination purposes of elongate lamps as mentioned in the introduction.

Although the invention manifests its advantageous effect with all elongate lamps which emit a significant proportion of their luminous flux through the end side of one or both lamp ends, elongate lamps based on dielectrically impeded discharges with strip-type electrodes have proved to be particularly advantageous. The strip-type electrodes are arranged either on the outer side or inner side of the wall of the elongate discharge vessel. This form of the electrodes in contrast to conventional electrodes fitted at the respective end sides of the cylindrical discharge vessel also enables the length of the non-luminous ends to be kept minimal. At the same time, a considerable luminous flux is coupled out from the end faces of the ends in the axial direction since, by virtue of the luminescent material coating in the case of fluorescent lamps or by virtue of the reflector coating in the case of aperture lamps, the tubular discharge vessel acts like an optical waveguide which guides the light along the tube axis.

The reflector of the coupling element is realized either by a diffusely reflective area or by a reflective area, e.g. by a reflective foil arranged on the receptacle area. In this case, however, the reflector need not necessarily be realized by a separate means, but rather may also be formed by the coupling element itself, for example in that the coupling element comprises a suitable reflective material or has a suitable color, for example white or in that the receptacle area of the coupling element is correspondingly processed, e.g. polished. What is crucial is that there are no absorbent areas in the region between the end sides of the lamp ends, since this would lead to considerable light losses owing to the multiple reflection. In this sense, therefore, the receptacle area is formed in continuous fashion. Nevertheless, the receptacle area or the coupling element need not necessarily be in one part, but rather may also be composed of two or more parts. With regard to the effect of the coupling element according to the invention, reference is supplementarily made to the exemplary embodiments.

Moreover, the ends of two lamps are preferably arranged within the coupling element such that the end sides of the two lamps are arranged as near as possible to one another without touching one another, typically with a distance of approximately 1 mm. On the one hand, this prevents stresses from arising if the lamps expand thermally during operation. On the other hand, the spatial extent of the luminance decrease caused by the gap between the two end sides is kept as small as possible. In order to simplify the arrangement of the lamp ends with minimal mutual distance between the end sides, it is advantageous to provide the coupling element with a suitable stop. Said stop may be realized e.g. in the form of a lug-like elevation in the receptacle area, the width of the elevation in the longitudinal direction defining the minimal mutual distance between the end sides. In this respect, the term "continuous receptacle area" is intended to encompass such a stop in the receptacle area which does not effect complete separation between the two lamp ends.

In a preferred embodiment, the coupling element is provided for receiving lamps with a tubular lamp vessel, the receptacle area being adapted to the tubular curvature of the outer side of the lamp vessel to be received. For this purpose, the receptacle area may be realized for example by the inner area of a half-shell. Since a half-shell inevitably leaves a light exit opening free, the half-shell itself may comprise a light-opaque material. This does not hold true if the coupling element is alternatively formed as a hollow cylinder. This is because, in order actually to enable light emission, the hollow cylinder must be produced from a light-transmissive material, for example Plexiglas. A part of the inner area is developed as a reflector area, the light exit area remaining free. As an alternative, the coupling element may also be produced from a parallelepiped, the receptacle area being realized by a suitable hole in said parallelepiped. If the hole is not completely enclosed within the parallelepiped, but rather forms a perforation which enables a light exit, the parallelepiped may likewise comprise a light opaque material. In any event, a part of the inner area is developed as a reflector area in this case as well. The parallelepiped form has the advantage that the coupling element formed in this way simultaneously serves as a lamp base and, by way of example, can be mounted on a lamp carrier, if appropriate with additional mounting means.

If more than two lamps, for example three lamps, are connected to one another via the coupling elements according to the invention to form an illumination system, it is necessary for at least one of the two coupling elements to be provided with electrical contacts in order also to be able to connect the "central" lamp to an electrical power supply. At least one of the two "outer" lamps is usually connected to an electrical power supply via the base terminal of its free end. The situation for the "central" lamp proves to be particularly simple if each lamp is provided with strip-type electrodes arranged on the outer side of the lamp vessel. It then suffices for a coupling element to be provided with contact areas, e.g. with elongate spring contacts arranged along the longitudinal axis of the receptacle area, which connect the electrodes of an "outer" lamp to the corresponding electrodes of the "central" lamp. It is thus also possible, in principle, to supply all the lamps with a single electrical power supply, namely if all the coupling elements are provided with the above-mentioned contacts. However, it will generally be more expedient to supply at least the two outer ends in each case with an electrical power supply in order to implement the modular character of this concept on the part of the electrical power supply as well. In this sense, it may also be expedient to provide a coupling element with additional terminals for an electrical power supply.

In a further variant, the coupling element is in two parts. The two parts may be fixedly connected to one another e.g. by means of a clip closure. In this way, each lamp may be produced as an individual part and then be directly combined on site during mounting without additional parts.

BRIEF DESCRIPTION OF THE DRAWINGS

The invention will be explained in more detail below with reference to exemplary embodiments. In the figures:

FIG. 4b shows a cross section of the illumination system from FIG. 4a, FIG. 4c shows a partial longitudinal section of the two-part variant from FIG. 4a, but in the separated state, FIG. 5 shows a partial longitudinal section of a further variant, the coupling element having electrical contacts.

BEST MODE FOR CARRYING OUT THE INVENTION

Figure 1A:
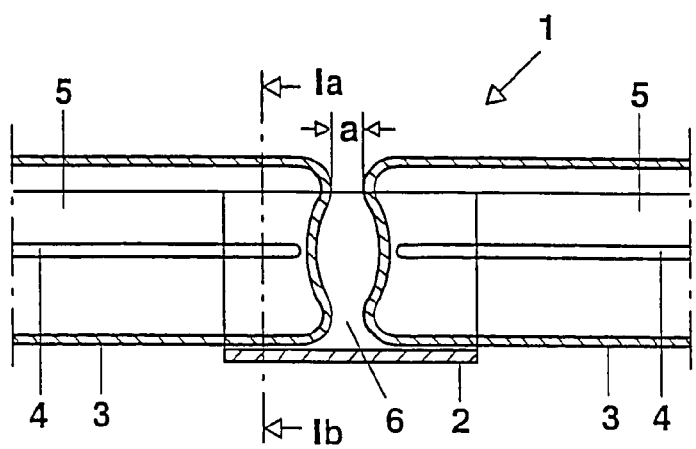
FIG. 1a shows a partial longitudinal section of an illumination system according to the invention with two aperture lamps connected by means of a coupling element in the form of a half-shell.
Figure 1B:
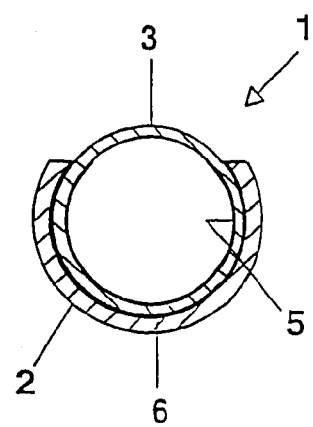
FIG. 1b shows a cross section of the illumination system from FIG. 1a along the line Ia–Ib.

FIGS. 1a, 1b diagrammatically show a longitudinal section and, respectively, a cross section along the line Ia–Ib of an elongate illumination system 1 according to the invention with two rod-type aperture florescent lamps 3 (only partially illustrated) coupled by means of a coupling element 2.

Each lamp 3 has two linear electrodes 4 arranged on the inner side of the wall of the lamp vessel diametrically and parallel to the longitudinal axis of the rod-type lamp 3 (only one of the two electrodes can be seen in the longitudinal section; the electrodes cannot be discerned in the cross section). The electrodes 4 are covered with a glass solder layer (not illustrated), which acts as a dielectric barrier with regard to the interior of the lamp vessel, i.e. with regard to the discharge during lamp operation. Thus, a discharge which is dielectrically impeded on both sides is involved in this case. The inner side of the wall of the lamp vessel has a luminescent material layer 5, an elongate aperture oriented parallel to the lamp longitudinal axis being cut out. A xenon-neon mixture with a xenon partial pressure of approximately 15 kPa is situated in the interior of the lamp vessel. For the rest, the lamp 3 essentially corresponds to the lamp disclosed in US-A 2002/0163306. Therefore, for further details, which, however, at most play a secondary role here, reference is made to the disclose content of this document, in particular to its FIGS. 3 and 5 with the associated description of the figures.

The coupling element 2 is formed from a non-transparent plastic material as a half-shell in which a respective end of the two lamps 3 is arranged. In this case, the half-shell 2 terminates with the extent of the luminescent material layer 5, i.e. it ends at the edge of the aperture. The mutual distance a between the lamp ends in the coupling element 2 is approximately 1 mm. The concave inner side of the coupling element 2 is reflection-coated with an aluminum foil 6.

Figure 2A:
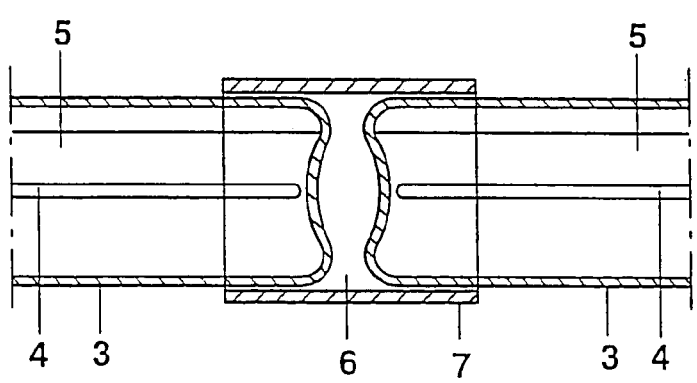
FIG. 2a shows a partial longitudinal section of a further variant, in which two aperture lamps are connected by means of a coupling element in the form of a hollow cylinder.
Figure 2B:
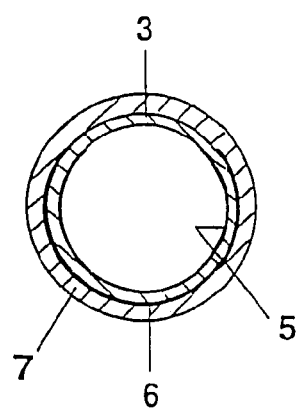
FIG. 2b shows a cross section of the illumination system from FIG. 2a, FIG. 3a shows a partial longitudinal section of a variant in which two aperture lamps are connected by means of a parallelepipedal coupling element.

FIGS. 2a, 2b diagrammatically show a variant of the above exemplary embodiment. In this case, features identical to those in FIGS. 1a, 1b are provided with identical reference symbols. Here, the coupling element is formed from a transparent plastic material as a hollow cylinder 7. The extent of the reflective layer 6 on the inner side of the hollow cylinder 7 is here likewise adapted to the extent of the luminescent material layer 5, i.e. the aperture here, too, is of course not reflection-coated.

Figure 3A:
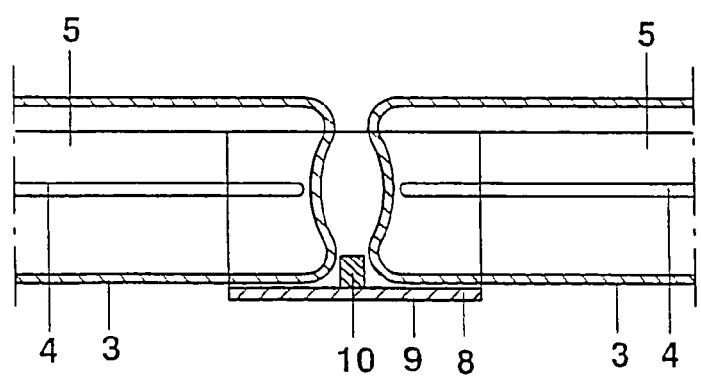
FIG. 3b shows a cross section of the illumination system from FIG. 3a, FIG. 4a shows a partial longitudinal section of a further variant with a two-part coupling element in the connected state.
Figure 3B:
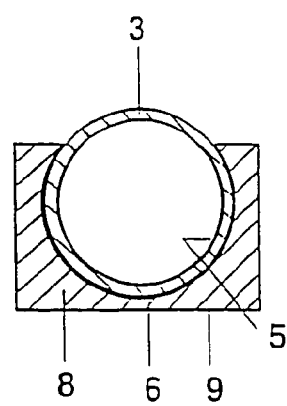

In the variant illustrated diagrammatically in FIGS. 3a, 3b, the coupling element is developed as a parallelepipedal lamp base 8 having a half-shell-type recess for receiving a respective end of the two lamps 3. The planar basal area 9 of this embodiment is suitable for mounting on a lamp carrier. Moreover, a lug-type stop 10 is additionally provided centrally on the inner side of the coupling element 8, and facilitates the setting of the mutual distance a between the ends of the two lamps 3.

The variant illustrated diagrammatically in FIGS. 4a to 4c differs from the embodiment illustrated in FIGS. 3a, 3b merely by the fact that the coupling element 11 is embodied in two parts. The two parts can be fixedly connected to one another by means of a latching lug 12 and an associated opening 13.

FIG. 5 diagrammatically shows a variant in which the linear electrodes 14 are arranged on the outer side of the vessel of the lamps 15. Thus, the vessel wall here serves as a dielectric for the dielectrically impeded discharge. The coupling element 16 has two elongate contact springs 17, which electrically conductively connect the two outer electrodes 14 of one lamp 15 to the two outer electrodes 14 of the other lamp 15.

Figure 6:
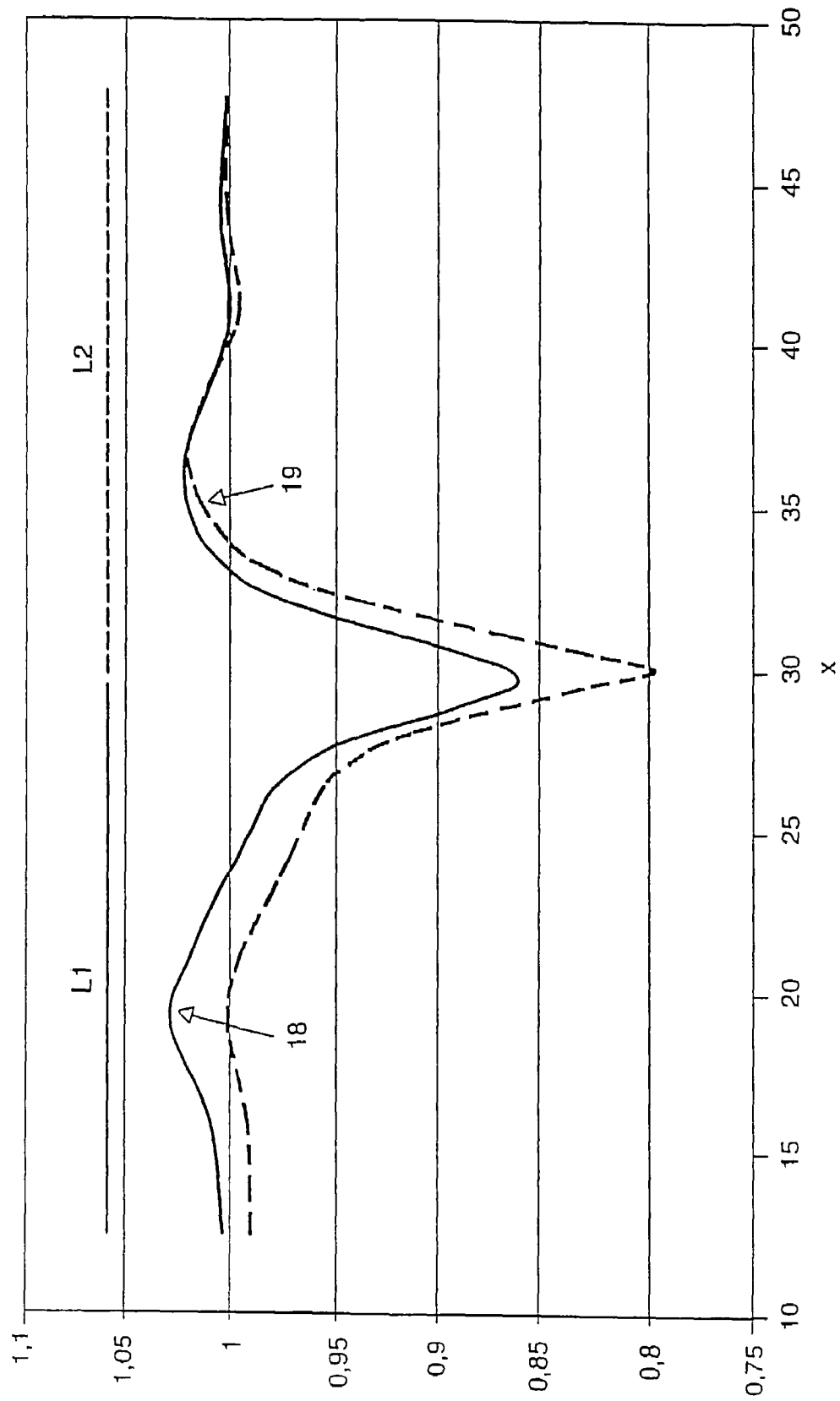
FIG. 6 shows a graphical illustration of illumination intensities measured along the illumination system of FIGS. 1a, 1b.

FIG. 6 shows the relative profile—measured at a distance of 8 mm above the aperture—of the illumination intensity (y-axis) for the exemplary embodiment in FIGS. 1a, 1b, where L1 and L2 symbolize the two lamps. The measurement curves 18, 19 show the results with and without a reflective foil within the coupling element. Without a reflective foil, the illumination intensity decreases by approximately 20% in the transition region between the two lamp ends (the measurement location is illustrated on the x axis). With a reflective foil, the decrease in the relative illumination intensity is reduced by approximately 25%. Moreover, it can be seen that the minimum is wider, i.e. the narrow dark zone is compensated for according to the invention by a wider brighter zone.

The above examples in each case show systems with two lamps which are connected to one another via one coupling element. It goes without saying, however, that the invention also encompasses systems with three or more lamps, two or correspondingly more coupling elements then being required, as has already been explained in the introduction.

What is claimed is:

1. A coupling element for combining at least two elongate lamps, the first lamp and the second lamp each having a respective exterior wall and a respective end, the coupling element having an interior wall defining a receptacle volume having a first region conforming to the exterior wall of the first lamp adjacent the end of the first lamp; and having a second region conforming to the exterior wall of the second lamp adjacent the end of the second lamp; the coupling element to retain the end of the first lamp end adjacent the end of the second lamp; wherein the first region further includes a light reflective surface facing the end of the first lamp and the second region further includes a light reflective surface facing the end of the second lamp; the receptacle further defining a light transmissive aperture commonly adjacent to the end of the first lamp and to the end of the second lamp receiving light from the first region and the second region.

2. The coupling element as claimed in claim 1, wherein the end of the first lamp includes at least one electrical input for the first lamp, the end of the second lamp includes at least one electrical input for the second lamp and the coupling element includes an electrical connection electrically connecting the electrical input of the first lamp to the electrical input of the second lamp.

3. An illumination system comprising:
a first lamp and a second lamp, each lamp having a respective exterior wall and a respective end, and
a coupling element having an interior wall defining a receptacle volume having a first region conforming to the exterior wall of the first lamp adjacent the end of the first lamp; and having a second region conforming to the exterior wall of the second lamp adjacent the end of the second lamp; the coupling element retaining the end of the first lamp end adjacent the end of the second lamp; wherein the first region further includes a light reflective surface facing the end of the first lamp and the second region further includes a light reflective surface facing the end of the second lamp; the receptacle further defining a light transmissive aperture commonly adjacent to the end of the first lamp and to the end of the second lamp receiving light from the first region and the second region.

* * * * *